US009052196B2

(12) United States Patent
Geiger et al.

(10) Patent No.: US 9,052,196 B2
(45) Date of Patent: Jun. 9, 2015

(54) CORIOLIS GYROSCOPE HAVING CORRECTION UNITS AND METHOD FOR REDUCING THE QUADRATURE BIAS

(75) Inventors: Wolfram Geiger, Ebingen (DE); Peter Leinfelder, Ehrenkirchen (DE)

(73) Assignee: Northrop Grumman LITEF GmbH, Freiburg (DE)

( * ) Notice: Subject to any disclaimer, the term of this patent is extended or adjusted under 35 U.S.C. 154(b) by 80 days.

(21) Appl. No.: 13/261,385

(22) PCT Filed: Feb. 1, 2011

(86) PCT No.: PCT/EP2011/000444
§ 371 (c)(1),
(2), (4) Date: Oct. 31, 2012

(87) PCT Pub. No.: WO2011/095317
PCT Pub. Date: Aug. 11, 2011

(65) Prior Publication Data
US 2013/0055787 A1   Mar. 7, 2013

(30) Foreign Application Priority Data
Feb. 2, 2010   (DE) .......................... 10 2010 006 584

(51) Int. Cl.
*G01C 25/00*   (2006.01)
*G01C 19/5755*   (2012.01)

(52) U.S. Cl.
CPC .................................. *G01C 19/5755* (2013.01)

(58) Field of Classification Search
USPC ................ 73/504.12, 504.14, 504.02, 504.04
See application file for complete search history.

(56) References Cited

U.S. PATENT DOCUMENTS

| 5,530,342 | A  | * | 6/1996  | Murphy ..................... 73/504.12 |
| 5,631,422 | A  | * | 5/1997  | Sulzberger et al. ........ 73/514.32 |
| 5,945,599 | A  | * | 8/1999  | Fujiyoshi et al. .......... 73/504.12 |
| 6,067,858 | A  | * | 5/2000  | Clark et al. ................ 73/504.16 |
| 6,250,156 | B1 | * | 6/2001  | Seshia et al. ............... 73/504.12 |
| 6,964,195 | B2 | * | 11/2005 | Hobbs et al. ............... 73/504.14 |
| 7,051,590 | B1 | * | 5/2006  | Lemkin et al. ............. 73/504.04 |
| 8,230,740 | B2 | * | 7/2012  | Katsuki et al. ............. 73/504.14 |
| 2004/0094814 | A1 | * | 5/2004 | Yoshioka et al. ............. 257/414 |

(Continued)

FOREIGN PATENT DOCUMENTS

DE   101 24 822 A1   12/2001
DE   102 37 410 A1   8/2003

(Continued)

*Primary Examiner* — Hezron E Williams
*Assistant Examiner* — Xin Zhong
(74) *Attorney, Agent, or Firm* — Elliott N. Kramsky

(57) ABSTRACT

A Coriolis gyroscope comprises a mass system that can be excited to perform vibrations parallel to a first axis, whereby a deflection of the mass system due to a Coriolis force along a second axis perpendicular to the first axis is detectable. At least one first correction unit and at least one second correction unit, which each comprise a plurality of stationary correction electrodes and moving correction electrodes whereby the stationary correction electrodes extend in the direction of the first axis and are firmly connected to the substrate by corresponding anchor structures, and the moving correction electrodes are provided as a part of the mass system. A method for reducing the quadrature bias of a Coriolis gyroscope of this type comprises applying at least temporarily constant corrective voltages to the correction units.

16 Claims, 4 Drawing Sheets

(56) References Cited

U.S. PATENT DOCUMENTS

2007/0144255 A1* 6/2007 Handrich et al. ......... 73/504.12
2008/0276707 A1* 11/2008 Sutton et al. ............. 73/504.04

FOREIGN PATENT DOCUMENTS

| | | |
|---|---|---|
| DE | 103 60 962 A1 | 7/2005 |
| DE | 10 2007 030 120 A1 | 1/2009 |

* cited by examiner

CORIOLIS GYROSCOPE HAVING CORRECTION UNITS AND METHOD FOR REDUCING THE QUADRATURE BIAS

BACKGROUND

1. Field of the Invention

The present invention relates to Coriolis gyroscopes. In particular, this invention pertains to a Coriolis gyroscope, a system of Coriolis gyroscopes and a method in which, and whereby, quadrature bias is reduced.

2. Description of the Prior Art

Coriolis gyroscopes (vibration gyroscopes, rotation rate sensor) comprise one or multi-part mass systems that are made to vibrate. A first vibration mode (excitation vibration) of the mass system is excited to operate the Coriolis gyroscope. If the Coriolis gyroscope is subjected to rotary motion about its sensitive axis, the Coriolis forces that occur excite a second vibration mode of the mass system, which is detected directly or indirectly, whereby a read-out signal reflecting the second vibration mode is obtained. The read-out signal is analyzed for changes in amplitude which are a measure of the rotation rate applied to the Coriolis gyroscope. In a closed-loop Coriolis gyroscope, a control circuit continuously restores the amplitude of the read-out vibration to a fixed value (e.g. zero) such that the applied rotation rate is derived from the required restoring forces.

The mass system can be designed as a one-part or multiple-part system. It may comprise, for example, two part-masses (resonators) that are coupled to one another by a spring system and can move relative to each other. In a multiple-part mass system, manufacturing tolerances can lead to misalignment (e.g. of the two resonators of a two-part single resonator). The misalignment produces a signal portion that is superimposed in quadrature (90° phase-shifted) over the actual signal portion from the applied rotation rate in the read-out signal of the Coriolis gyroscope. Usually, quadrature signal portions (quadrature bias, quadrature signal, quadrature error) are much larger than those from the desired rotation rate resolution, making the two signal portions difficult to separate. Due to the large difference between the signal portions, even small phase shifts lead to marked noticeable errors in the rotation rate signal (zero-point error, bias).

Known methods to reduce the quadrature bias in a Coriolis mass rotated and/or deflected by a voltage that is applied to specialized control electrodes are described in DE 103 60 962 B4 and DE 102 37 410 A1.

U.S. Pat. No. 6,067,858 describes a structure for reducing quadrature bias that consists of individual correction electrodes. Symmetrical distances must exist between the individual electrodes. Moreover, such structures can be implemented only with buried oxides in the manufacturing process.

SUMMARY AND OBJECTS OF THE INVENTION

It is an object of the invention to reduce the contribution of misalignments to the quadrature bias in Coriolis gyroscopes and in systems of Coriolis gyroscopes coupled to one another.

It is another object of the invention to achieve the preceding object without having to rotate and/or deflect the Coriolis mass.

It is yet a further object of the invention to achieve the above objects without reliance upon the use of buried oxides in the manufacturing process.

The preceding and other objects are addressed by the present invention that provides, in a first aspect, a Coriolis gyroscope. Such gyroscope includes a mass system. Such system can be excited to perform vibrations parallel to a first axis whereby a deflection of the mass along a second, perpendicular axis due to a Coriolis force, is detectable.

At least one first correction unit and one second correction unit are provided. Each unit comprises a plurality of stationary and moving correction electrodes. The stationary correction electrodes extend in the direction of the first axis and are firmly connected to the substrate by corresponding anchor structures. The moving correction electrodes are a part of the mass system.

In a second aspect, the invention provides a system of at least two Coriolis gyroscopes. Each gyroscope comprises a mass system that can be excited to perform vibrations parallel to a first axis whereby a deflection of the mass system due to a Coriolis force along a second, perpendicular axis, coupled to one another, is detectable.

Such system comprises at least one first correction unit and at least one second correction unit. Each unit comprises a plurality of stationary correction electrodes and moving correction electrodes. The stationary correction electrodes extend in the direction of the first axis and are firmly connected to the substrate by corresponding anchor structures. The moving correction electrodes are a part of the mass system of at least one of the two Coriolis gyroscopes.

In a third aspect, the invention provides a method for reducing the quadrature bias of a coriolis gyroscope of the type that comprises (1) a mass system that can be excited to perform vibrations parallel to a first axis whereby a detectable deflection of the mass system occurs along a second perpendicular axis due to a Coriolis force and (2) at least one first correction unit and a second correction unit, which each comprise a plurality of stationary correction electrodes and a plurality of moving correction electrodes, whereby the stationary correction electrodes extend in the direction of the first axis and are firmly connected to the substrate by corresponding anchor structures, and the moving correction electrodes are a part of the mass system.

Such method is characterized by applying at least temporarily constant corrective voltages to the correction units.

In a fourth aspect, the invention provides a method for reducing the quadrature bias in a system of at least two Coriolis gyroscope. Each of such gyroscopes comprises a mass system that can be excited to perform vibrations parallel to a first axis whereby a detectable deflection of the mass system occurs along a second perpendicular axis due to Coriolis force. The Coriolis gyroscopes are coupled to one another whereby the system comprises at least one first correction unit and at least one second correction unit, each comprising a plurality of stationary correction electrodes and moving correction electrodes. The stationary correction electrodes extend in the direction of the first axis and are firmly connected to the substrate by corresponding anchor structures and the moving correction electrodes are a part of the mass system of at least one of the at least two Coriolis gyroscopes.

Such method is characterized by the application of at least temporarily constant corrective voltages to the correction units.

The foregoing and other features of the invention will become further apparent from the detailed description that follows. Such description is accompanied by a set of drawing figures. Numerals of the drawings, corresponding to those of the written description, point to the features of the invention with like numerals referring to like features throughout.

DETAILED DESCRIPTION OF THE PREFERRED EMBODIMENT

Figure 1:
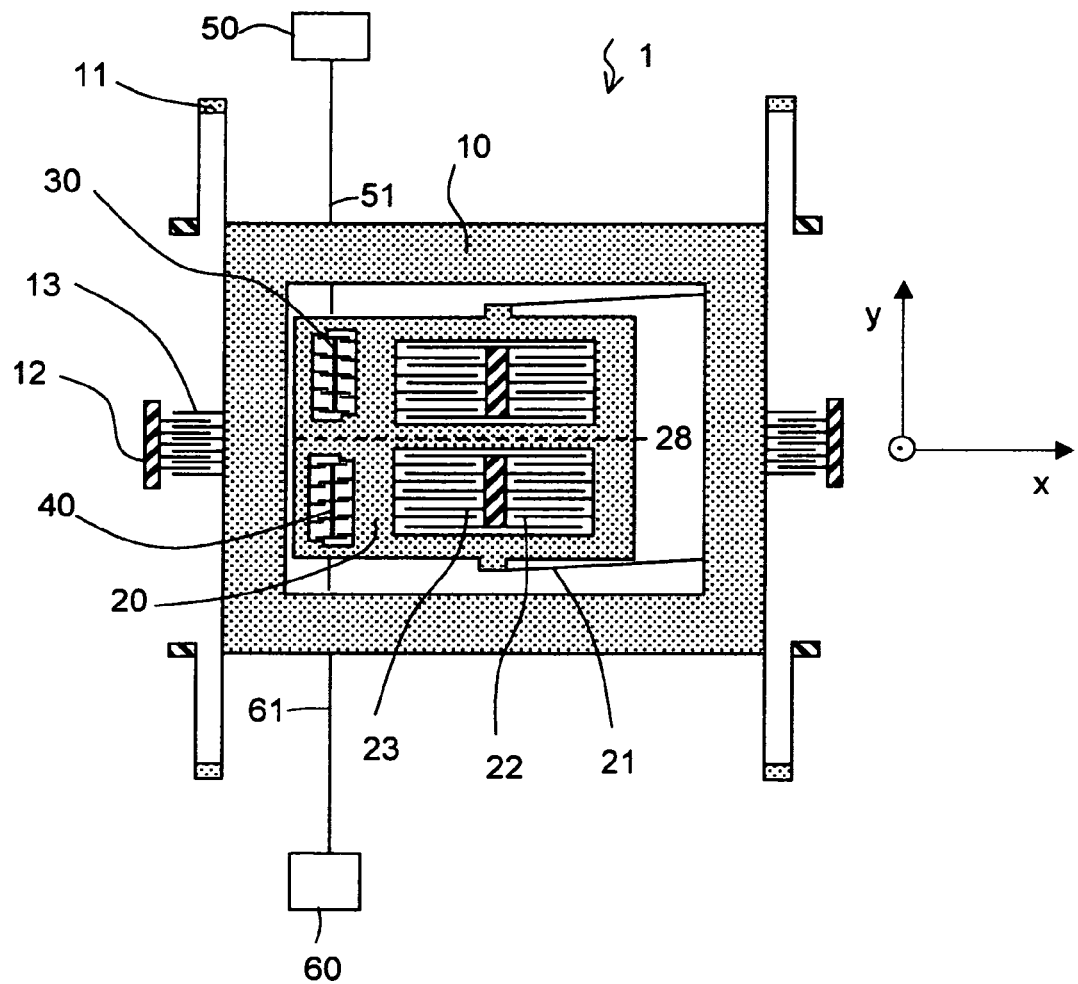
FIG. 1 is a schematic top view of a Coriolis gyroscope having a two-part single resonator in accordance with the invention.

FIG. 1 is a schematic top view of a Coriolis gyroscope 1 having a single two-part resonator according to the invention. The linear single resonator is preferably manufactured by etching processes from a silicon disk and comprises a first part-mass 10 (drive frame), a second part-mass 20 (Coriolis mass), first spring elements 11 and second spring elements 21. The drive frame 10 is connected by the first spring elements 11 to a substrate that is positioned beneath the part-masses 10, 20. The first spring elements 11 are provided so that the first part-mass 10 and the second part-mass 20 can vibrate jointly along a first axis (x direction). The Coriolis mass 20 is connected by the second spring elements 21 to the first part-mass 10 and is suspended in such manner that it can vibrate with respect to the first part-mass 10 along a second axis (y direction) that is perpendicular to the first axis.

The spring elements 21 are not limited to a specific design.

The first and the second part-mass 10, 20 form the mass system of the Coriolis gyroscope 1. The Coriolis gyroscope further comprises stationary excitation electrodes 12 and stationary detection electrodes 23 that are mechanically connected to, but electrically insulated from, the substrate. (The term, "substrate" shall be understood to mean a mechanical, non-vibrating structure, in which the part-masses 10 and 20 are "embedded", e.g. the non-vibrating part of a silicon disk) or of a part of a silicon disk. The Coriolis gyroscope further comprises moving excitation electrodes 13 which are an integral component of the first part-mass 10, and moving detection electrodes 22 which are an integral component of the second part-mass 20 in this embodiment. The excitation electrodes 12 and 13 assume two functions, first excitation and, secondly, detecting the motion of the first part-mass in the first direction (x axis of the coordinate system drawn in the figure). In this way, the excitation electrodes are suitably electronically triggered. In another exemplary embodiment, the functions of the excitation electrodes can be separated by providing double excitation electrodes.

It is customary to apply alternating voltage to the stationary excitation electrodes 12. The moving excitation electrodes 13, which are firmly connected to, and move along with, the drive frame 10, form the electrical counter-pole. The resulting electrostatic forces excite the drive frame 10 to vibrate along the x direction. The second spring elements 21 transmit the motion to the Coriolis mass 20. Due to the vertical orientation of the first spring elements 11, the drive frame 10 is prevented from moving along the second axis (y direction) that extends perpendicular to the first axis. However, vertical vibration in the y direction can be performed by the Coriolis mass 20 due to the essentially horizontal orientation of the second spring elements 21. If corresponding Coriolis forces occur due to rotation about a sensitive axis perpendicular on the drawing plane, the Coriolis mass 20 is excited to perform vibrations in the y direction.

The motion in the y direction generated by the Coriolis forces is detected and read-out by the moving detection electrodes 22 that are firmly connected to, and move along with, the Coriolis mass 20, and the stationary detection electrodes 23, whereby this motion is a measure of the applied rotation rate. As an alternative to the open-loop method illustrated above, the motion of the second resonator 20 in the y direction can be prevented by a control circuit and suitable damping electrodes so that the requisite forces in a closed-loop method of this type are measured by means of the electrical voltage required to prevent the y motion, a measure of the applied rotation rate. In the exemplary embodiment selected, the detection electrodes 22 and 23 provide two functions for the closed-loop method. They are the functions of detection and damping, for which purpose these electrodes are suitably triggered by electronic means. However, the detection electrodes can just as well be subdivided into two subunits of the same design with each subunit having one of the two functions assigned to it.

Other embodiments of a Coriolis gyroscope are as feasible as the embodiment shown in FIG. 1. For example, detection of the y motion of the Coriolis mass can proceed on a separate body, which itself does not perform an x motion, but moves along on the y motion of the Coriolis mass by means of suitable spring units. It thus assumes the sole function of detection and can also be called detection frame. In operating the gyroscope in closed-loop, the functions of detection and restoring usually occur on the separate body (detection frame) However, both functions can just as well be distributed to the Coriolis mass and the separate body.

In another embodiment, the Coriolis gyroscope can comprise a single vibrating mass (hereinafter "Coriolis mass"). The functions of the drive frame, Coriolis mass, and detection as well as that of damping in the closed-loop method, are then provided in a single structure.

Figure 4:
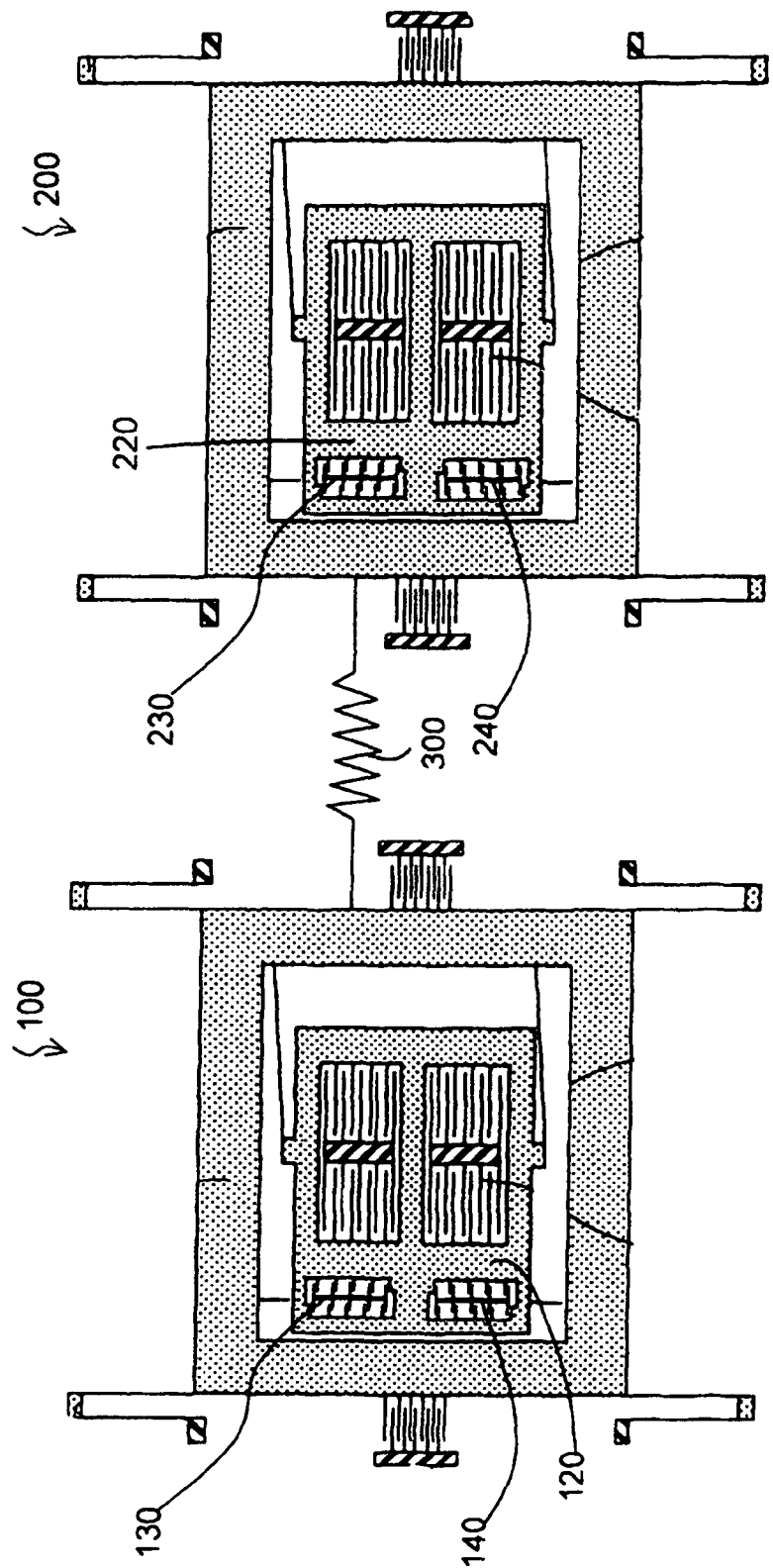
FIG. 4 is a schematic top view of a system of two coupled Coriolis gyroscopes in accordance with the invention.

Moreover, several of the Coriolis gyroscopes 1 shown in FIG. 1 can be combined into a single sensor, as is indicated in FIG. 4. In this context, for example, two Coriolis gyroscopes can be made to vibrate along a common vibration axis in push-pull. This allows reduction in the sensitivity of the coupled system to external interference and/or interference emitted by the coupled system into the substrate, in which the single resonators are provided. Obviously, the coupling of two Coriolis gyroscopes can go beyond the level shown in FIG. 4. Depending on the specific embodiment, not only the drive masses are coupled to each other, but the Coriolis masses or the detection frames are coupled as well.

In case the excitation motion is not oriented exactly perpendicular to the detection motion, a portion of the acceleration forces from the excitation motion (which can, for example, be 9 orders of magnitude larger than the Coriolis acceleration) couples in the direction of detection. This means that the Coriolis force generated by the rotary motion very quickly becomes just a fraction of the force eliciting the detection motion which leads to an error in the measurement of rotation rate. In particular, in the case of very small rotation rates, orientation errors of the two part-masses with respect to one another or a deviation of the motion direction of the Coriolis mass with respect to the coordinate system defined by the excitation electrodes and the stationary detection electrodes lead(s) to a measuring error that has an adverse effect on the functioning of the Coriolis gyroscope. FIGS. 1 and 4 show a possible example of the error mechanism in the form of the second spring elements 21 being oriented somewhat inclined with respect to the excitation motion along the x axis due to manufacturing tolerances. Since the Coriolis forces are a direct function of the velocity of the excitation motion, they are 90° out of phase (in quadrature) with respect to the accelerating forces from the excitation motion that are directly connected to the amplitude of the excitation motion and/or to the second derivative with respect to time.

To reduce or compensate for this error (also called quadrature bias), the Coriolis gyroscope shown in FIG. 1 has first and second correction units 30 and 40, respectively. They are always present in pairs at least once on the Coriolis mass. Each comprise stationary correction electrodes that are connected mechanically, but electrically insulated from, the substrate, as well as moving correction electrodes that are rigidly mechanically connected. In the embodiment shown in FIG. 1, the stationary correction electrodes of the first correction unit 30 are electrically connected to a first control unit 50 and the stationary correction electrodes of the second correction unit 40 are electrically connected to a second control unit 60, whereby the stationary correction electrodes of the correction units 30 and 40 are maintained and/or controlled at defined electrical potentials. The first control unit 50 applies a first corrective voltage to the first correction unit 30, while the second control unit 60 applies a second corrective voltage to the second correction unit 40. The correction units 30 and 40 are connected to the corresponding control unit 50 and 60, respectively, by electrical connection lines 51 and 61 that are electrically insulated from other components of the Coriolis gyroscope. The electrical connection lines 51, 61 can, for example, be provided on the substrate as electrically conductive regions or as printed conductors made of an electrically conductive material.

The correction units 30 and 40 of the embodiment of the Coriolis gyroscope shown in FIG. 1 are arranged in mirror images with respect to a mid-line 28 of the Coriolis mass 20. The two correction units 30 and 40 can also both be arranged above or below the mid-line 28 and/or at the same or a different distance from the mid-line 28. Similarly, the position of the correction units 30 and 40 with respect to the detection electrodes 22, 23 can be freely adjusted to the design of the Coriolis gyroscope. Accordingly, one or both correction units can be arranged to the right or above or below the detection electrodes 22, 23. Arrangement between partial regions of the detection electrodes 22, 23, as shown in FIG. 1, is also feasible.

Figure 2:
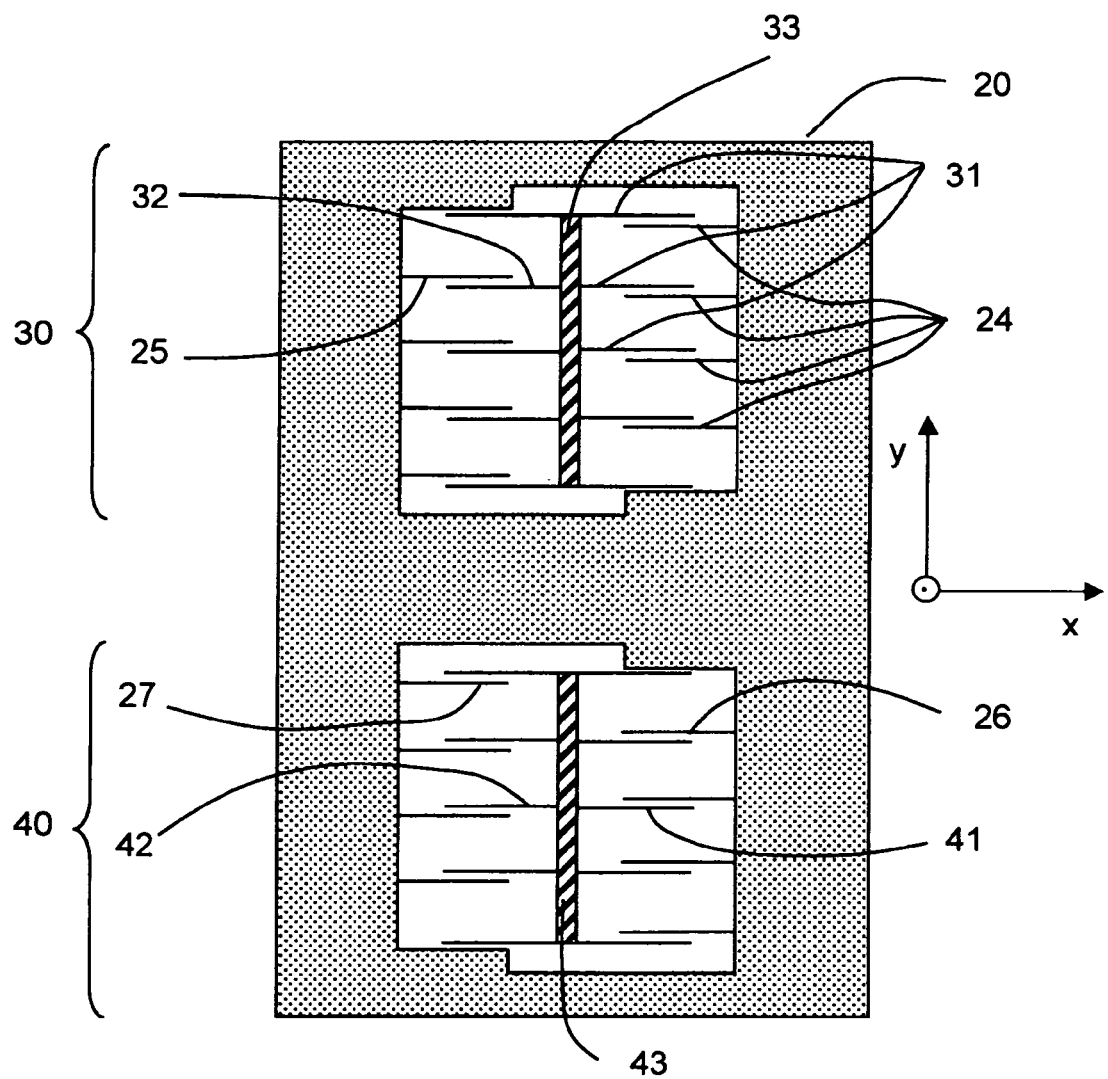
FIG. 2 is a detailed schematic top view of the correction units of FIG. 1.

FIG. 2 is a detailed schematic top view of the correction units of FIG. 1. Each correction unit 30, 40 consists of a plurality of first stationary correction electrodes 31 and/or 41 and of second stationary correction electrodes 32 and/or 42, which are rigidly connected to the substrate. Moreover, each correction unit 30 and/or 40 has a plurality of first moving correction electrodes 24 and/or 26 and of second moved correction electrodes 25 and/or 27, which are provided together as a single part with the Coriolis mass 20. Therefore, the moving correction electrodes 24, 25, 26, 27 move with respect to the stationary correction electrodes 31, 32, and/or 41, 42, respectively, when the Coriolis mass 20 is made to move.

Should a constant voltage be applied to the stationary correction electrodes 31, 32 and/or 41, 42, the excitation motion generates electrostatic forces that are directly proportional to the amplitude of the excitation motion and the second derivative with respect to time thereof and lead to a reduction of quadrature bias. For this purpose, the magnitudes of the constant voltages are selected to match the magnitude and orientation of the quadrature signal to be reduced or compensated. Moreover, the applied constant voltage can also be used to influence the resonant frequency of the Coriolis mass 20 in the y direction. This can be utilized, in addition, for trimming and/or targeted adjustment of the resonant frequencies of excitation and read-out.

To a first order, the forces thus generated only have x-dependent or y-dependent force components. The y-dependent force component leads to negative spring stiffness that acts against that of the second spring elements 21 and thus leads to reduced resonant frequency of the Coriolis mass 20 in the detection (y) direction. The force effect can be minimized by suitable selection of the length of overlap in the resting state of the stationary correction electrodes 31, 32 and/or 41, 42 with respect to the moving correction electrodes 24, 25, and/or 26, 27. Alternatively, the y-dependent force component can just as well be used for desired frequency adjustment of excitation frequency and resonant frequency of the Coriolis mass in the detection direction.

The force effect is directly proportional to deflection motion of the Coriolis mass in the x direction. This causes it to have a fixed phase position of 90° with respect to the velocity of excitation. Thus, the force effect from the correction electrode is not subject to a phase rotation, which prevents a contribution to the bias. This also means that, upon temporary change of the phase position in the transfer function of excitation to read-out motion (ideally 90° but not required), the corrective forces rotate at the same phase with the forces for the quadrature and the compensation effect is maintained.

Another aspect is that, for example in an arrangement similar to the one shown in FIG. 4, but with additional coupling of the Coriolis masses and/or detection frames, manufacturing tolerances can lead to a situation in which no compensation of quadrature bias by deflection of the Coriolis masses in the y direction is feasible. However, the quadrature bias can always be compensated with the form of correction electrodes described herein.

The force components for reducing or compensating quadrature bias do not depend on the overlap of the stationary correction electrodes 31, 32 and/or 41, 42 and moving correction electrodes 24, 25, and/or 26, 27. The correction units 30 and 40 can therefore be designed to be very small. Accordingly, the requisite minimal length of overlap is approximately twice as long as the amplitude of the excitation vibration plus a certain length to reach a linear amplitude-dependent force effect. For example, for excitation amplitudes of approximately 10 µm, a length of overlap of approximately 15 µm, with total length of the correction electrodes of 30 to 35 µm, is conceivable. This usually is approximately one-tenth of the dimension required for frequency adjustment of drive and detection resonant frequencies.

As is shown in detail in FIG. 2, the correction units 30, 40 (pairs of which are present) comprise a plurality of stationary correction electrodes 31, 32 and/or 41, 42 and a plurality of moving correction electrodes 24, 25 and/or 26, 27. The stationary correction electrodes 31, 32 and/or 41, 42 are each connected to the substrate in a mechanically rigid manner by means of a common anchor structure 33 and/or 43, but are electrically insulated from them.

The size of the anchor structure can be adjusted to fit the manufacturing method of the Coriolis gyroscope. The base area of the anchor structure is in the range between 2,500 µm$^2$ and 0.04 mm$^2$. As a matter of principle, anchor structures are desired to be as small as possible, since they generate additional space needs and thus make the total structure larger. The lower limit of the base area is determined by the technological capabilities and manufacturing method of the Coriolis gyroscope. Where the anchor structures, for example, are connected to their substrate by silicon-fusion bonding (SFB), the anchor structure can, in particular, be provided to be at least 70×70 µm$^2$ without losing the advantage of small space needs for the correction electrodes due to their overlap length being small. Since the requisite total lengths of the correction electrodes are small, the correction electrodes can also be kept very narrow (e.g. up to approximately 5 µm or even smaller) depending on manufacturing method. The minimal width of the correction electrodes is also limited by technological capabilities with mechanical aspects (e.g. bending of the electrodes in operation, snap-in) making a contribution. This therefore allows an overall small size of correction units 30 and 40 to be achieved despite the relatively large anchor structure. The size of the anchor structure described above is of advantage, especially for a manufacturing method in which a silicon fusion bonding method is used to connect stationary structures that are produced separately from the substrate (i.e. the anchor and stationary correction electrodes) to the substrate. However, the stationary structures may be generated just as well by an etching process directly in the substrate or in a layer that has been applied onto the substrate.

The first stationary correction electrodes 31 and 41 extend from the anchor structure 33 and 43, respectively, in a first direction (positive x direction), whereas the second stationary correction electrodes 32 and 42 extend from the anchor structure 33 and 43, respectively, in a second direction (negative x direction). The second direction is opposite to the first direction. The first moving correction electrodes 24 and/or 26 extend from the Coriolis mass 20 in the second direction, while the second moving correction electrodes 25 and/or 27 extend from the Coriolis mass 20 in the first direction. Accordingly, the first moving correction electrodes 24 and 26 extend into the intervening spaces provided between the individual first stationary correction electrodes 31 and 41, respectively, while the second moving correction electrodes 25 and 27 extend into the intervening spaces provided between the second stationary correction electrodes 32 and 42, respectively. This results in the correction electrodes having a comb-like structure, in which one stationary correction electrode and one moving correction electrode each are situated opposite from each other and are separated from each other in the y direction by a gap.

The number of stationary and moving correction electrodes extending in the first direction in a correction unit is preferably equal to the number of stationary and moving correction electrodes extending in the second direction.

One of the stationary correction electrodes 31, 32 and 41, 42 each is assigned to exactly one of the moving correction electrodes 24, 25 and 26, 27, respectively. A part of the Coriolis mass 20 acts as moving correction electrode that is assigned to a stationary correction electrode. The upper left part of the Coriolis mass 20 in the first correction unit 30 acts, for example, as moving correction electrode with respect to the topmost stationary correction electrode 32, whereas the lower right part of the Coriolis mass 20 acts as moving correction electrode with respect to the lowest stationary correction electrode 31. The distance between a stationary correction electrode and the moving correction electrode assigned to it (called "gap distance" hereinafter) is smaller than the distance between two identical stationary correction electrodes or two identical moving correction electrodes and is smaller than the distance between the corresponding stationary correction electrode and another adjacent moving correction electrode. Due to the antisymmetric arrangement of the moving correction electrodes 24 and 26 as well as of the moving correction electrodes 25 and 27 with respect to the corresponding stationary correction electrodes 31 and 41 as well as 32 and 42, respectively, the application of a direct voltage generates a force that is directly proportional to the deflection of the correction electrodes along the first axis (x axis). The correction units 30 and 40, which are in a mirror-imaged arrangement with respect to the x axis, allow for algebraic sign-independent compensation of the quadrature.

The different distances of a moving correction electrode 24, 25, 26, and 27 to the adjacent stationary correction electrodes 31, 32, 41, and 42, respectively, are due to manufacturing technology and allow the areas required for the anchor structures to be minimal. Moreover, they contribute to defining the orientation of quadrature compensation.

In the correction unit 30, the stationary correction electrodes extending in the first direction each are arranged above the moving correction electrodes assigned to them, while the stationary correction electrodes extending in the second direction each are arranged below the assigned moving correction electrodes. In this context, "above" means in a third direction with respect to the assigned moving correction electrode (positive y direction) whereas "below" means in a fourth direction with respect to the assigned moving correction electrode (negative y direction), with the fourth direction being opposite to the third direction. The third and fourth directions extend along the second axis (y axis) perpendicular to the first and second directions.

In the exemplary embodiment of FIG. 2, the arrangement of the stationary and moving correction electrodes in the correction unit 40 with respect to each other is provided to be mirror-symmetrical with respect to the x axis.

The stationary correction electrodes of the second correction unit 40 are arranged with respect to the moving correction electrodes assigned to them exactly opposite to their arrangement of the first correction unit 30. The orientation of the force resulting from the second correction unit 40, for an arbitrary applied voltage and a motion of the Coriolis mass 20 along the first axis (x axis), is inverted with respect to the resultant force from the first correction unit 30.

According to the invention, the Coriolis mass 20 comprises both correction units 30 and 40 in the inverted arrangement with respect to each other that is shown in FIG. 2. It is insignificant whether the correction unit 30 is positioned above or below 40 (in the y direction) or whether each correction unit is inverted in the y direction (mirrored about the x axis). The specific arrangement influences only the application of a voltage to the correction unit.

If the Coriolis gyroscope comprises further correction units, the correction units can have the same constant voltage, voltages of the same magnitude and different polarity, voltages of the same polarity and different magnitude or totally different voltage and polarity applied to them. It is just as well to apply a direct voltage to just one of the correction units. Other correction units may be grounded or floating.

Figure 3:
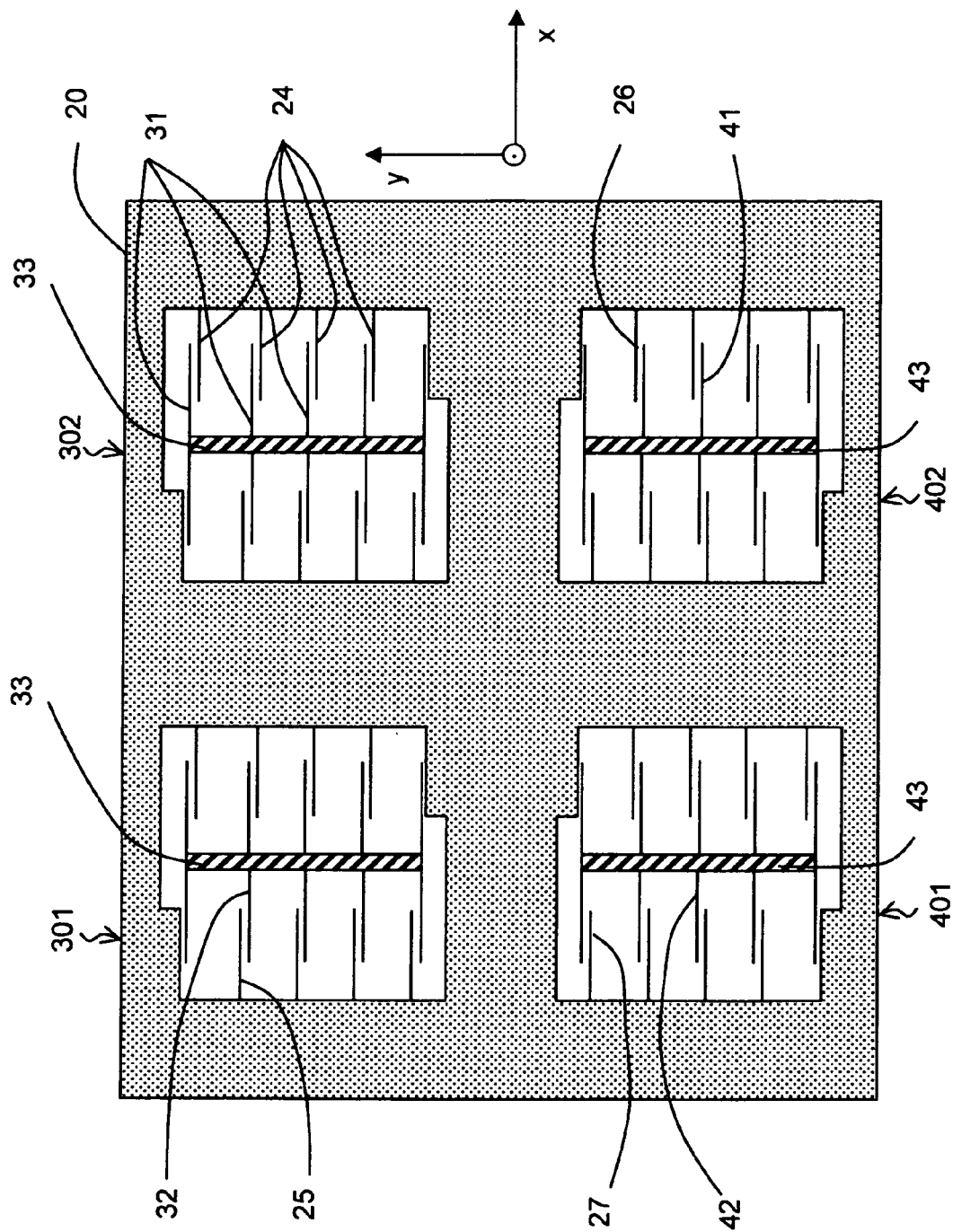
FIG. 3 is a detailed schematic top view of a Coriolis gyroscope having multiple correction units.

FIG. 3 is a detailed schematic top view of a Coriolis gyroscope having multiple correction units of the same type. The first correction unit and the second correction units each are present in duplicate. FIG. 3 shows a detail of the Coriolis mass 20 similar to FIG. 2. In this embodiment, the Coriolis gyroscope has four correction units 301, 302, 401, and 402. The correction units 301 and 302 are provided to be alike with each corresponding to a first correction unit 30 as the one shown in FIG. 2. The correction units 401 and 402 are also provided to be alike and each corresponds to a second correction unit 40 as the one shown in FIG. 2. The correction units 301 and 302 are inverted with respect to the correction units 401 and 402. The correction units 301 and 401 form a first pair of correction units that are inverted with respect to each other, whereas the correction units 302 and 402 form a second pair of correction units that are inverted with respect to each other.

The correction units 301 and 302 can have constant voltages of opposite polarity and the same magnitude applied to them. The same applies to the correction units 401 and 402. This reduces electrical coupling effects, such as, for example, compensating currents. This effect is beneficial not only in the open-loop procedure, but also in the closed-loop procedure due to the always present residual motion due to the regulation.

One effect of a Coriolis gyroscope according to the invention is its independence from the design of the spring elements 21. Since the Coriolis mass 20 does not need to be deflected or rotated, various types of spring elements 21 can be utilized. In particular, the spring elements 21 can be designed to be insensitive to acceleration, which imparts more extensive vibration insensitivity to the Coriolis gyroscope. The quadrature signal is then determined only by the inclined position of the spring elements 21, but not by their deflection and/or exposure to the load of the accelerating force from the excitation vibration.

Another clear advantage is given by just one contiguous anchor structure being required per correction unit, which simplifies the design and the manufacturing process.

The above-described correction units can be used for systems of one or more resonators and for systems that are fully closed, partly closed or open with respect to the drive motion and/or the detection motion. In this context, a closed motion means that the accelerations and momenta resulting from the motion balance out.

Correction units of this type can also be used in coupled systems made up of multiple Coriolis gyroscopes, whereby the arrangement of the individual Coriolis gyroscopes is insignificant for functioning of the correction units. For example, in a coupled system made up of two Coriolis gyroscopes, the excitation motion of one Coriolis gyroscope can be phase-shifted by 180 degrees with respect to the excitation motion of the other Coriolis gyroscope. In an arrangement made up of four Coriolis gyroscopes, in which the excitation motion of two Coriolis gyroscopes each is phase-shifted by 180 degrees with respect to each other, the individual Coriolis gyroscopes can be arranged, for example, in series or in pairs below each other. The correction units and/or the subunits thereof in systems with fixed coupling can be freely subdivided to various Coriolis masses in terms of detection. This allows the number of printed conductors that need to be guided to a Coriolis gyroscope to be reduced.

FIG. 4 is a schematic top view of a system of two coupled Coriolis gyroscopes in accordance with the invention. The coupled system comprises, for example, two Coriolis gyroscopes 100 and 200, which each are provided according to the embodiment shown in FIG. 1 and are coupled to each other with respect to the excitation motion by means of a mechanical coupling element 300 (e.g., a spring). In this context, identical components of the respective Coriolis gyroscopes are labeled with the same reference numbers that have been illustrated in reference to FIG. 1. Each Coriolis gyroscope 100 or 200 of the version shown in FIG. 4 has pairs of correction units 130 and 140 and/or 230 and 240.

In an embodiment that couples the two Coriolis masses 120 and 220 with respect to their motion in the y direction, it is also feasible for the first Coriolis gyroscope 100 to have just the correction unit 130, while the second Coriolis gyroscope 200 has just the correction unit 240 or just one Coriolis gyroscope 100 has both correction units 130 and 140 and the other Coriolis gyroscope, for example Coriolis gyroscope 200, has no correction unit.

As has been described with regard to FIG. 1, the correction units 130, 140, 230 and/or 240 each have a constant corrective voltage applied to them by at least one control unit (not shown). In this context, the stationary correction electrodes of the correction units 130, 140, 230 and/or 240 are connected to the at least one control unit by means of electrical connection lines.

Reviewing the preceding, a Coriolis gyroscope comprises a mass system that can be excited to perform vibrations parallel to a first axis. The mass system can be provided in one part or comprise at least two part-masses. In the case of multiple-part mass systems, at least one of the part-masses (Coriolis element) is affixed in such manner that deflection of said part-mass by a rotary motion about a sensitive axis that is perpendicular to the first axis is detectable along a second axis that is perpendicular to the first and the sensitive axis. The deflection of the part-mass in a closed-loop system can be detectable, for example, by the generation of restoring forces for compensation of the deflection.

The Coriolis gyroscope according to the invention further comprises at least one first correction unit and at least one second correction unit, which each comprise a plurality of stationary correction electrodes and a plurality of moving correction electrodes. The stationary correction electrodes extend in the direction of the first axis and are firmly connected by corresponding anchor structures to a substrate with respect to which the mass system is suspended such as to be mobile. The moving correction electrodes are an integral component of the mass system and are mobile with respect to the substrate.

The Coriolis gyroscope comprises, for example, a first part-mass (drive frame) that is being excited to perform a linear vibration along the first axis, and a second part-mass (Coriolis frame, Coriolis mass, detection frame) that is connected to the first part-mass in mobile manner and is connected with respect to the first mass in such manner that it is mobile perpendicular to the excitation direction, whereby said possible deflection motion along the direction of the Coriolis forces, which are generated due to the application of a rotation rate and the excitation motion, can be detected. In this context, the second part-mass comprises the moving correction electrodes as well as one set of detection electrodes serving for detection of the deflection of the second part-mass, and, optionally, a set of electrodes for restoring the deflection.

According to another embodiment, the Coriolis gyroscope comprises a first part-mass (drive frame) that is being excited to perform a linear vibration along the first axis, a second part-mass (Coriolis frame, Coriolis mass) that is affixed such as to be deflectable on account of the Coriolis force, and a third part-mass (detection frame) that is connected to the second part-mass in such mobile manner that it cannot perform the excitation motion, but is forced to move along on the deflection motion of the Coriolis frame in the second direction, by means of which the deflection of the Coriolis frame is detected. To rephrase this, the functional unit of Coriolis frame and detection frame is being separated. The moving correction electrodes of the correction units are a fixed component of the Coriolis frame in this context. The electrode sets for detection and/or restoration are usually assigned to the third part-mass, which, if separate electrode sets are used for detection and restoration, is associated with the opportunity to arrange these separately as well on the third and second part-mass.

The correction units according to the invention each comprise, for example, an equal number of first stationary correction electrodes and second stationary correction electrodes. The first stationary correction electrodes extend from the corresponding anchor structure along the first axis in a first direction. The second stationary correction electrodes extend from the corresponding anchor structure in a second direction that is opposite to the first direction. Likewise, the correction unit can comprise an equal number of first and second moving correction electrodes. The first moving correction electrodes extend from a reference point within the circumference of that part-mass of which it is an integral component, in the second direction, and the second moving correction electrodes extend in the first direction.

The distance between a stationary correction electrode and each of its adjacent moving correction electrodes differs. Accordingly, the ratio of the two distances must be selected to be unequal to 1. In order to obtain an effective force effect, the ratio should be selected to be as large or as small as possible, although this increases the space needs. Taking into account the space needs increasing as a function of the ratio of the distances, for the force effect to be as effective as possible, the resulting optimal ratio of the distances is $\sqrt{2}$. The moving correction electrode having a smaller distance to the stationary correction electrode shall hereinafter be called the moving correction electrode that is assigned to the stationary correction electrode. The first stationary correction electrodes are arranged along the second axis, each above the first moving correction electrodes assigned to them, whereas the second stationary correction electrodes each are arranged below the second moving correction electrodes assigned to them. In this context, the terms, "above" and "below", shall refer to a direction along the second axis. The part-mass comprising the moving correction electrodes is provided in such manner that it serves as a first and a second moving correction electrode each with respect to a first and a second stationary correction electrode, respectively. The arrangement of the stationary correction electrodes with respect to the moving correction electrodes assigned to them along the second axis may just as well be inverted.

In an embodiment, the Coriolis gyroscope comprises a first and a second correction unit that are provided to be inverted with respect to each other. As an option, the Coriolis gyroscope can comprise multiple first and/or multiple second correction units, each provided to be alike, or multiple pairs of first and second correction units that are provided to be inverted with respect to each other.

The stationary correction electrodes and/or the moving correction electrodes can each have fins with a width of maximally 10 μm.

In an embodiment, the Coriolis gyroscope has at least one control unit that generates a corrective voltage. The stationary correction electrodes and the moving correction electrodes are connected to the at least one control unit, whereby different correction units can be triggered and/or controlled separately by different corrective voltages. The corrective voltages are constant, at least temporarily, and are direct voltages in the simplest case whose magnitudes can be adjusted such that a quadrature bias is minimized. However, it is also feasible to control the corrective voltages as a function of the deflection perpendicular to the excitation motion (y direction). The electrodes of the correction units are provided in such manner that, upon a motion of the moving electrode parts in excitation direction while an electrical voltage is being applied, forces in the detection direction are generated that are a function of the deflection in excitation direction.

Moreover, the invention provides systems having at least two Coriolis gyroscopes that are coupled to each other, whereby each Coriolis gyroscope comprises a mass system that can be excited to perform vibrations parallel to a first axis, whereby a deflection, on account of the Coriolis force, of the mass system along a second axis that extends perpendicular to the first axis can be detected. In this context, the system comprises at least a first and at least a second correction unit of the type described in the context of the individual Coriolis gyroscope.

A system comprises, for example, two Coriolis gyroscopes which together are provided as linear double resonator, whereby the two single resonators are excited to perform vibrations along the first axis that are opposite to each other.

In an embodiment, in which the Coriolis gyroscopes are coupled only with respect to the excitation, the correction units in each Coriolis gyroscope each are arranged in pairs such as to be inverted with respect to each other.

If the individual Coriolis gyroscopes are also coupled with regard to detection though, as is known, for example, from DE 10 2007 030 120 A1, the at least two separate correction units that are in an inverted arrangement with respect to each other can be arranged at will on the individual Coriolis gyroscopes.

The methods according to the invention for reducing the quadrature bias of a Coriolis gyroscope according to the invention or a system according to the invention comprise the application of a corrective voltage between stationary and moving correction electrodes of the correction units.

The corrective voltage is a direct voltage whose magnitude is being adjusted as a function of the orientation and magnitude of the quadrature bias that is to be reduced. Which of the at least two correction units that are present and are arranged inverted with respect to each other has the voltage applied to it depends on the algebraic sign of the quadrature bias to be compensated.

Alternatively or in addition, the magnitude of the direct voltage can be adjusted as a function of a given change in the resonant frequency of the mass system along the second axis. In this case, the existing two correction units that are arranged in pairs and inverted with respect to each other both have a voltage of equal magnitude applied to them. The direct voltage portion for quadrature bias compensation is superimposed with the correct algebraic sign over the voltage for frequency adjustment.

If the Coriolis gyroscope comprises more than two correction units, preferably a multiple of two, the correction units can have different voltages applied to them preferably in such manner that sum of the voltages balances out. For example correction units of the same type, i.e. correction units that are not provided to be inverted with respect to each other, can have voltages of the same magnitude, but different polarity, applied to them.

While this invention has been described with reference to a presently preferred embodiment, it is not limited thereto. Rather, the invention is limited only insofar as it is defined by the following set of patent claims and includes within its scope all equivalents thereof.

What is claimed is:

1. Coriolis gyroscope comprising
    a mass system above a substrate that can be excited to perform vibrations parallel to a first axis, whereby a deflection of said mass system on account of a Coriolis force along a second axis that is provided perpendicular to the first axis is detectable; and
    stationary excitation electrodes connected to the substrate and moving excitation electrodes being part of the mass-system for exciting and detecting motion of the mass-system along the first axis;
    stationary detection electrodes connected to the substrate and moving detection electrodes being part of the mass-system for detecting motion of the mass system along the second axis; and at least one first correction unit and one second correction unit, which each comprise a plurality of stationary correction electrodes and moving correction electrodes, whereby the stationary correction electrodes extend in the direction of the first axis and are firmly connected to the substrate by corresponding anchor structures and the moving correction electrodes are a part of the mass system, whereby each stationary correction electrode has a moving correction electrode assigned to it, whereby the distance between the respective stationary correction electrode and the moving correction electrode assigned to it is smaller than the distance between the respective stationary correction electrode and another adjacent moving correction electrode;

first stationary correction electrodes of the first correction unit or of the second correction unit extend from the corresponding anchor structure in a first direction along the first axis, and second stationary correction electrodes of the first correction unit or of the second correction unit extend from the corresponding anchor structure in a second direction along the first axis, whereby the second direction is opposite to the first direction;

first moving correction electrodes extend from the mass system in the second direction along the first axis, and second moving correction electrodes extend from the mass system in the first direction along the first axis;

each first stationary correction electrode in the first correction unit is arranged in a third direction along the second axis, as seen from the first moving correction electrode assigned to it, whereas each second stationary correction electrode is arranged in a fourth direction along the second axis, as seen from the second moving correction electrode assigned to it, whereby the fourth direction is opposite to the third direction; and each first stationary correction electrode in the second correction unit is arranged in the fourth direction along the second axis, as seen from the first moving correction electrode assigned to it, whereas each second stationary correction electrode is arranged in the third direction along the second axis, as seen from the second moving correction electrode assigned to it, characterized in that the first and second stationary correction electrodes of the same correction unit each extend from a common anchor structure.

2. Coriolis gyroscope according to claim 1, characterized in that the mass system of the Coriolis gyroscope consists of a first part-mass and a second part-mass, whereby a deflection of the second part-mass on account of the Coriolis force can be detected, and whereby the moving correction electrodes are provided as the same part together with the second part-mass.

3. Coriolis gyroscope according to claim 1, further comprising a control circuit that is well-suited for detecting the deflection of the mass system on account of the Coriolis force by means of the generation of restoring forces for compensation of the deflection.

4. Coriolis gyroscope according to claim 1, characterized in that the plurality of stationary correction electrodes has, in each case, an equal number of first stationary correction electrodes and of second stationary correction electrodes, and the plurality of moving correction electrodes has, in each case, an equal number of first moving correction electrodes and of second moving correction electrodes.

5. Coriolis gyroscope according to claim 1, characterized in that the stationary correction electrodes and/or the moving correction electrodes each have a width of maximally 10 μm.

6. Coriolis gyroscope according to claim 1, further comprising at least one control unit that is electrically connected to the correction units and is well-suited for applying to them at least temporarily constant corrective voltages.

7. Method for reducing the quadrature bias of a Coriolis gyroscope according to claim 1, whereby the method comprises a step of applying at least temporarily constant corrective voltages to the correction units whereby the corrective voltages are selected taking into account the quadrature bias to be reduced, characterized in that the magnitude of the corrective voltages is adjusted as a function of a defined change in the resonant frequency of the mass system along the second axis.

8. Coriolis gyroscope according to claim 1, characterized in that the Coriolis gyroscope comprises multiple first correction units of the same design and/or multiple second correction units of the same design.

9. Coriolis gyroscope according to claim 8, characterized in that the Coriolis gyroscope comprises an equal number of first and second correction units.

10. Method for reducing the quadrature bias of a Coriolis gyroscope according to claim 8, whereby the method comprises a step of applying at least temporarily constant corrective voltages to the correction units, whereby the corrective voltages are selected taking into account the quadrature bias to be reduced, characterized in that the sum of the corrective voltages that are being applied to correction units of the same design balances out.

11. System comprising at least two Coriolis gyroscopes, which each comprise a mass system above a substrate that can be excited to perform vibrations parallel to a first axis, whereby a deflection of the mass system on account of a Coriolis force along a second axis that is provided perpendicular to the first axis is detectable, and which are coupled to each other, and stationary excitation electrodes connected to the substrate and moving excitation electrodes being part of the mass-system for exciting and detecting motion of the mass-system along the first axis;

stationary detection electrodes connected to the substrate and moving detection electrodes being part of the mass-system for detecting motion of the mass system along the second axis; and at least one first correction unit and at least one second correction unit, which each comprise a plurality of stationary correction electrodes and moving correction electrodes, whereby the stationary correction electrodes extend in the direction of the first axis and are firmly connected to the substrate by corresponding anchor structures, and the moving correction electrodes are a part of the mass system of at least one of the at least two Coriolis gyroscopes, whereby each stationary correction electrode has a moving correction electrode assigned to it, whereby the distance between the respective stationary correction electrode and the moving correction electrode assigned to it is smaller than the distance between the respective stationary correction electrode and another adjacent moving correction electrode;

first stationary correction electrodes of the first correction unit or of the second correction unit extend from the corresponding anchor structure in a first direction along the first axis, and second stationary correction electrodes of the first correction unit or of the second correction unit extend from the corresponding anchor structure in a second direction along the first axis, whereby the second direction is opposite to the first direction;

first moving correction electrodes extend from the mass system in the second direction along the first axis, and second moving correction electrodes extend from the mass system in the first direction along the first axis;

each first stationary correction electrode in the first correction unit is arranged in a third direction along the second axis, as seen from the first moving correction electrode assigned to it, whereas each second stationary correction electrode is arranged in a fourth direction along the second axis, as seen from the second moving correction electrode assigned to it, whereby the fourth direction is opposite to the third direction; and each first stationary correction electrode in the second correction unit is arranged in the fourth direction along the second axis, as seen from the first moving correction electrode assigned to it, whereas each second stationary correction electrode is arranged in the third direction along the second axis, as seen from the second moving correction electrode assigned to it, characterized in that the first and second stationary correction electrodes of the same correction unit each extend from a common anchor structure.

12. System according to claim 11, characterized in that the plurality of stationary correction electrodes has, in each case, an equal number of first stationary correction electrodes and of second stationary correction electrodes; and the plurality of moving correction electrodes has, in each case, an equal number of first moving correction electrodes and of second moving correction electrodes.

13. System according to claim 11, characterized in that the at least two Coriolis gyroscopes perform coupled movement in response to a detection of the deflection of the mass system on account of the Coriolis force that acts along the second axis; and at least one of the Coriolis gyroscopes comprises at least one first correction unit and at least one of the Coriolis gyroscopes comprises at least one second correction unit.

14. System according to claim 11, further comprising at least one control unit that is electrically connected to the correction units and is well-suited for applying to them at least temporarily constant corrective voltages.

15. System according to claim 11, characterized in that the at least two Coriolis gyroscopes perform coupled movement in response to an excitation motion that excites the mass system to perform vibrations parallel to the first axis, and each Coriolis gyroscope comprises at least one first correction unit and at least one second correction unit.

16. System according to claim 15, characterized in that at least one first correction unit of a first Coriolis gyroscope is designed to be identical to at least one first correction unit of a second Coriolis gyroscope; and at least one second correction unit of the first Coriolis gyroscope is designed to be identical to at least one second correction unit of the second Coriolis gyroscope (200).

\* \* \* \* \*